(12) United States Patent
Luo et al.

(10) Patent No.: US 8,742,293 B2
(45) Date of Patent: Jun. 3, 2014

(54) INVERTER OUTPUT RECTIFIER CIRCUIT

(71) Applicants: Lifeng Larry Luo, Solon, OH (US); Matthew Jon Krueger, Medina, OH (US)

(72) Inventors: Lifeng Larry Luo, Solon, OH (US); Matthew Jon Krueger, Medina, OH (US)

(73) Assignee: Lincoln Global Inc., City of Industry, CA (US)

( * ) Notice: Subject to any disclaimer, the term of this patent is extended or adjusted under 35 U.S.C. 154(b) by 0 days.

(21) Appl. No.: 13/827,188

(22) Filed: Mar. 14, 2013

(65) Prior Publication Data

US 2013/0194828 A1    Aug. 1, 2013

Related U.S. Application Data

(62) Division of application No. 12/495,976, filed on Jul. 1, 2009.

(51) Int. Cl.
*B23K 9/10* (2006.01)
*H02M 3/337* (2006.01)
*H02M 3/335* (2006.01)

(52) U.S. Cl.
CPC ............ *B23K 9/1043* (2013.01); *H02M 3/337* (2013.01); *H02M 3/33507* (2013.01)
USPC .................. 219/130.1; 219/137 PS; 361/111

(58) Field of Classification Search
CPC ....... B23K 9/1006; B23K 9/1043; B23K 9/32
USPC ........ 219/130.1, 130.21, 137 PS; 363/15, 16, 363/20, 21, 50, 52, 56, 58, 98, 132, 142, 363/143; 361/86, 91, 111
See application file for complete search history.

(56) References Cited

U.S. PATENT DOCUMENTS

| | | | | |
|---|---|---|---|---|
| 3,274,479 | A * | 9/1966 | Kurimura et al. | 363/77 |
| 4,392,172 | A * | 7/1983 | Foley et al. | 361/8 |
| 5,691,891 | A * | 11/1997 | Fasullo et al. | 363/93 |
| 7,187,531 | B1 * | 3/2007 | Chen | 361/111 |

* cited by examiner

*Primary Examiner* — Tu B Hoang
*Assistant Examiner* — Thien S Tran
(74) *Attorney, Agent, or Firm* — Hahn Loeser & Parks; Brendan E. Clark

(57) ABSTRACT

In a power source of a welding system, an inverter rectifier output circuit and method for reducing the blocking voltages across saturable reactors associated with a rectifier coupled to a transformer winding in the inverter rectifier output circuit during both turn-on and turn-off transitions of the rectifier. At least a portion of a reverse recovery current associated with the rectifier is blocked by allowing blocking voltages to build across associated saturable reactors during a transition phase of the rectifier. During a turn-off portion of the transition phase, the blocking voltages are reduced using a RC circuit, thereby suppressing a peak voltage associated with the rectifier. During a turn-on portion of the transition phase, the blocking voltages are reduced using another saturable reactor in series with a free-wheeling diode.

6 Claims, 5 Drawing Sheets

INVERTER OUTPUT RECTIFIER CIRCUIT

CROSS-REFERENCE TO RELATED APPLICATIONS/INCORPORATION BY REFERENCE

This application is a Division of U.S. patent application Ser. No. 12/495,976, entitled "INVERTER OUTPUT RECTIFIER CIRCUIT", filed on Jul. 1, 2009, which is incorporated herein by reference in its entirety. U.S. Pat. No. 6,995,337 to Blankenship et al. issued on Feb. 7, 2006 is incorporated herein by reference in its entirety as background information related to arc welding power sources. U.S. Pat. No. 5,351,175 to Blankenship issued on Sep. 27, 1994 is incorporated herein by reference in its entirety as background information related to inverter power supplies for welding. U.S. Pat. No. 4,897,522 to Bilczo et al. issued on Jan. 30, 1990 is incorporated herein by reference in its entirety as background information related to inverter power supplies for welding.

TECHNICAL FIELD

Certain embodiments relate to power transformation and power converters. More particularly, certain embodiments relate to circuits and methods for providing a rectified inverter output.

BACKGROUND

A power converter is a power processing circuit that converts an input voltage waveform into a specified output voltage waveform. In many applications requiring a DC output, switched-mode DC/DC converters are frequently employed. Such converters generally include an inverter, an input/output isolation transformer, and a rectifier on a secondary side of the isolation transformer. The inverter generally includes a switching device, such as a field effect transistor ("FET"), that converts the DC input voltage to an AC voltage. The input/output isolation transformer then transforms the AC voltage to another value and the rectifier generates the desired DC voltage at the output of the converter. Conventionally, the rectifier includes a plurality of rectifying diodes that conduct the load current only when forward-biased in response to the input waveform to the rectifier.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

A new modified inverter rectifier output circuit scheme has been devised that provides reduction of blocking voltages across saturable reactors during both turn-on and turn-off portions of the transition phases of the rectifying diodes. Such an inverter rectifier output circuit may be used in a power source of an arc welding system, for example. The inverter rectifier output circuit employs a method of reducing the blocking voltages across saturable reactors associated with a rectifier coupled to a transformer winding in the inverter rectifier output circuit during both turn-on and turn-off transitions of the rectifier. The method includes reducing at least a portion of a reverse recovery current associated with the rectifier by allowing blocking voltages to build across associated saturable reactors of the inverter rectifier output circuit during a transition phase of the rectifier. The method further includes reducing the blocking voltages during a turn-off portion of the transition phase with a RC circuit, thereby suppressing a peak voltage associated with the rectifier. The method also includes reducing the blocking voltages during a turn-on portion of the transition phase with another saturable reactor in series with a free-wheeling diode.

These and other features of the claimed invention, as well as details of illustrated embodiments thereof, will be more fully understood from the following description and drawings.

DETAILED DESCRIPTION

Figure 1:
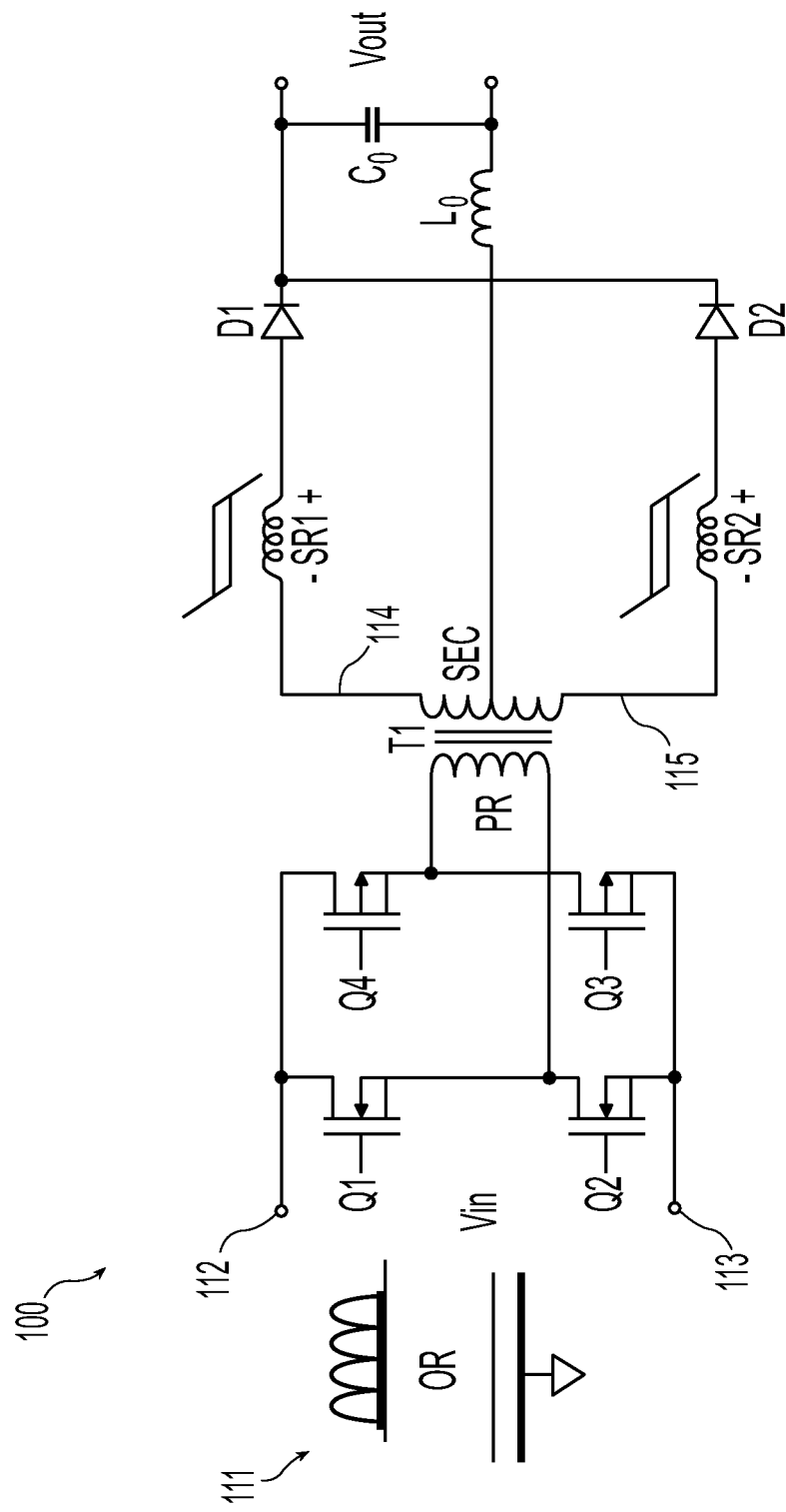
FIG. 1 illustrates a portion of a conventional high speed amplifier inverter that may be used in a welding power supply.

FIG. 1 illustrates a portion of a conventional high speed amplifier inverter 100 that may be used in a welding power supply. While the high speed amplifier inverter 100 employs a full-bridge topology, other types of converter topologies are well within the broad scope of the claimed invention.

A DC output bus is defined at leads 112 and 113. An input rectifier converts three phase AC power (or single phase AC power) to a rectified DC output power 111. Between the leads of the DC bus, there is provided switching circuitry that is operated alternately to create output pulses for the primary side of an output transformer T1.

The high speed amplifier inverter portion 100 is coupled to the source of electrical power 111 and provides an output voltage Vout to a load coupled to an output thereof. The high speed amplifier inverter portion 100 includes a transformer T1 having a primary winding PR and a center tapped secondary winding SEC. The high speed amplifier inverter portion 100 also includes a primary circuit having first, second, third and fourth switches Q1, Q2, Q3, Q4 controllable by a control circuit (not shown) to transfer power from the source of electrical power to the load. The high speed amplifier inverter portion 100 also includes a rectifier having first and second rectifying diodes D1, D2 and an output filter circuit having an output filter inductor Lo and filter capacitor Co.

The high speed amplifier inverter portion 100 may still further include a transient suppressor having a first saturable reactor SR1 and a second saturable reactor SR2. In the illustrated embodiment, the first and second saturable reactors SR1 and SR2 are each coupled to the first and second rectifying diodes D1, D2, respectively.

In an exemplary operating mode, the high speed amplifier inverter portion 100 generally operates as set forth below. The first, second, third and fourth switches Q1, Q2, Q3, Q4 are arranged in two diagonal pairs that are alternately turned on for a fraction of a switching period to apply opposite polarities of an input voltage Vin across the primary winding PR of the transformer T1. Thus, the switches Q1, Q2, Q3, Q4 operate to convert the input voltage Vin, provided by the rectified DC output power 111, into an AC voltage to properly operate the transformer T1. Between conduction intervals of the diagonal pairs, all the switches Q1, Q2, Q3, Q4 are turned off for a fraction of the switching period.

As will be described in more detail below, the rectifier (diodes D1 and D2) then rectifies the AC voltage delivered by the secondary winding SEC of the transformer T1. The output filter circuit decomposes the rectified voltage into AC and DC components. The DC component, which is generally fixed, is the output voltage Vout of the high speed amplifier inverter 100. The control circuit may monitor the output voltage Vout and adjust the duty ratio of the first, second, third and fourth switches Q1, Q2, Q3, Q4 to control the output voltage Vout, or to run open loop with fixed duty cycle.

Regarding the switching transitions, during a first interval, the first and third switches Q1, Q3 conduct to apply the input voltage Vin across the primary winding PR of the transformer T1. The first rectifying diode D1 is forward biased during this period to deliver a secondary current via the output filter circuit to the load. During a second interval, all the switches Q1, Q2, Q3, Q4 are turned off and, due to the current draw associated with the output filter inductor Lo, the first and second rectifying diodes D1, D2 are conducting during this period.

Then, during a third interval, the second and fourth switches Q2, Q4 conduct to apply a voltage (opposite in polarity to that of the first interval) across the primary winding PR of the transformer T1. Additionally, the first rectifying diode D1 is reversed biased and the second rectifying diode D2 delivers the secondary current via the output filter circuit to the load. The switches Q1, Q2, Q3, Q4 are then turned off during a fourth interval and, due to the current draw associated with the output filter inductor Lo, the first and second rectifying diodes D1, D2 are forward biased and conducting during this period. As the first interval commences again, the second rectifying diode D2 is reverse biased and the first rectifying diode D1 is forward biased to deliver the secondary current via the output filter circuit to the load.

The first and second rectifying diodes D1, D2 suffer from a reverse recovery condition when there is a transition from a conduction stage to a non-conduction stage. During the reverse recovery condition, the current through the first and second rectifying diodes D1, D2 reverses direction, causing excess energy to be stored in the leakage inductance of the transformer T1 and power to be lost in the rectifying diodes D1, D2. The energy stored in the leakage inductance is dissipated in a resonant manner with the junction capacitance of the rectifying diodes D1, D2, causing oscillation (or ringing) and overshoot in the voltage waveform thereof. As a result, the high speed amplifier inverter portion 100 suffers efficiency losses that impair the overall performance thereof.

Figure 2:
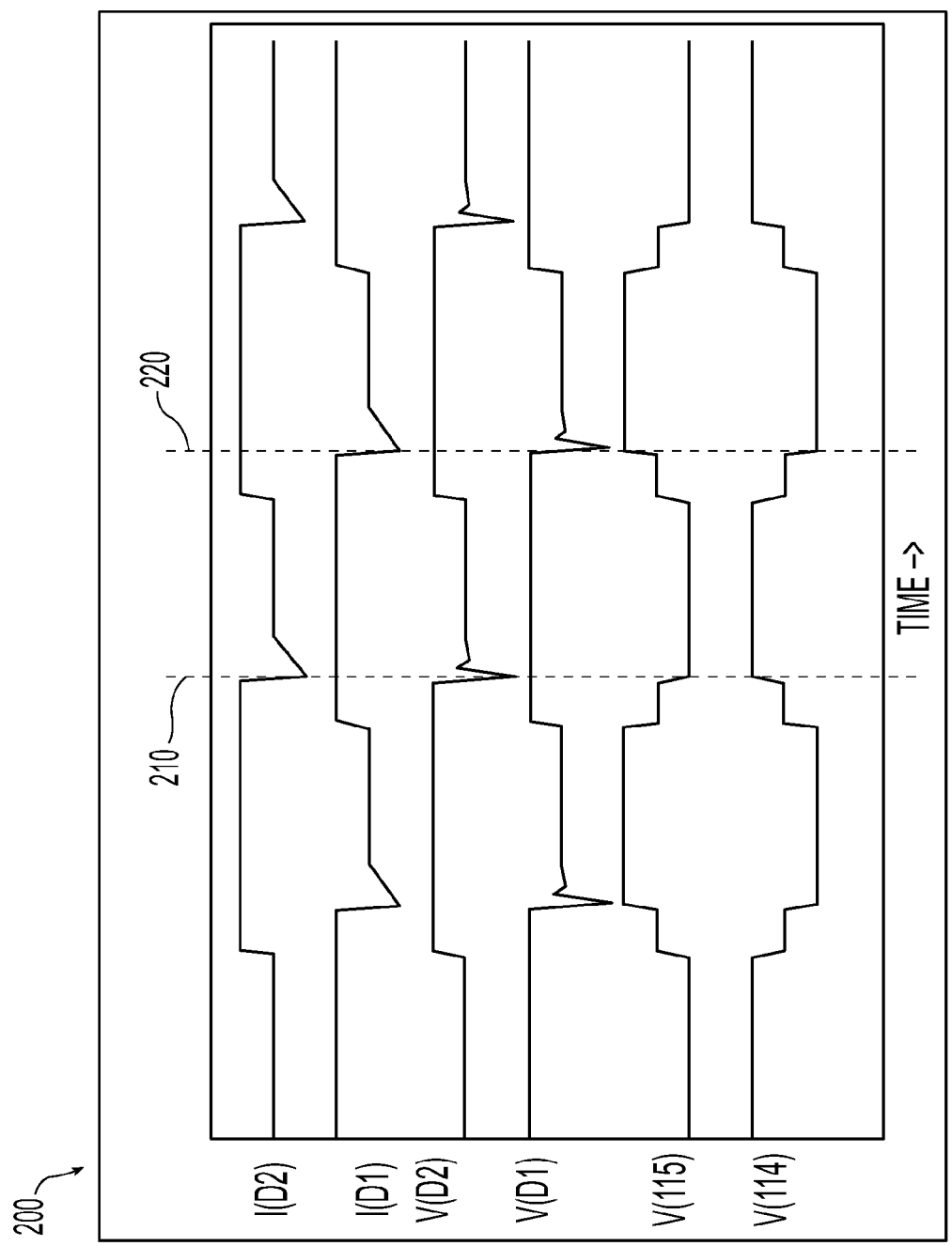
FIG. 2 illustrates an example timing diagram associated with the operation of the portion of the conventional high speed amplifier inverter of FIG. 1 if the saturable reactors are not present.

FIG. 2 illustrates an example timing diagram 200 associated with the operation of the portion of the conventional high speed amplifier inverter of FIG. 1 if the saturable reactors SR1 and SR2 are not present (i.e., if the anodes of the diodes D1 and D2 are connected directly to the secondary windings of the transformer T1). Nodes 114 and 115 of FIG. 1 are used to illustrate the switching action and to show the corresponding positive and negative voltage changes at these nodes. As shown in FIG. 2, when either diode D1 or D2 turn off, there is a large negative voltage spike across the diode as seen in the timing diagrams for V(D1) and V(D2) of FIG. 2. For example, refer to turn-off transition time 210 for diode D2 and turn-off transition time 220 for diode D1. Simultaneously, there is a large reverse recovery current in either the current through diode D1, I(D1), or the current through diode D2, I(D2), during the corresponding turn-off transition times as shown in FIG. 2. The voltage overshoot and ringing combined with the reverse recovery currents cause excessive power to be dissipated in the circuit 100. In the worst case, the voltage overshoot may exceed the diode reverse voltage rating and damage the part.

Including the saturable reactors SR1 and SR2 helps to reduce the deleterious effects of the reverse recovery condition and thereby the losses associated with the operation of the rectifier. As discussed, the reverse recovery condition occurs when one of the first or second rectifying diodes D1, D2 is initially reverse biased. An internal diode storage charge, which occurs during the forward biased condition of the rectifying diode has to be discharged before the rectifying diode can turn-off. Discharging this internal diode storage charge during reverse recovery results in a reverse recovery current that flows in a direction opposite to the forward biased current. The oscillation and overshoot effects of the voltage waveform associated with this reverse recovery current are substantially ameliorated by the saturable reactors SR1 and SR2.

The first saturable reactor SR1 is coupled to the first rectifying diode D1 and operates to block its reverse recovery current for a period of time. The attributes of the saturable reactor are chosen to provide a number of volt-seconds of blocking time, which is proportional to an area of the BH curve (called a blocking area BA) associated with the saturable reactor circuit. This blocking area BA may be expressed by: BA=K[(Vrmax)(trrmax)], where Vrmax is a maximum reverse voltage to be allowed across the first rectifying diode D1, trrmax is a maximum reverse recovery time allowed for the first rectifying diode D1, and K is an empirically determined constant. The constant K may be chosen to provide a margin of safety for the blocking time wherein a value of two may be typical.

A blocking voltage Vb builds across the first saturable reactor SR1 (with the polarity shown in FIG. 1) while the forward biased current is reduced by reverse voltage across the rectifying diode D1. The saturable reactor SR1 is designed to work in a saturation mode. However, the energy dissipated or snubbed in the saturable reactor SR1 using the conventional design in a welding power supply application may be very high. As a result, the saturable reactor SR1 may get very hot during operation and may exceed the temperature rating of the component. Analogously, the second saturable reactor SR2 coupled to the second rectifying diode D2 operates in a similar manner.

Figure 3:
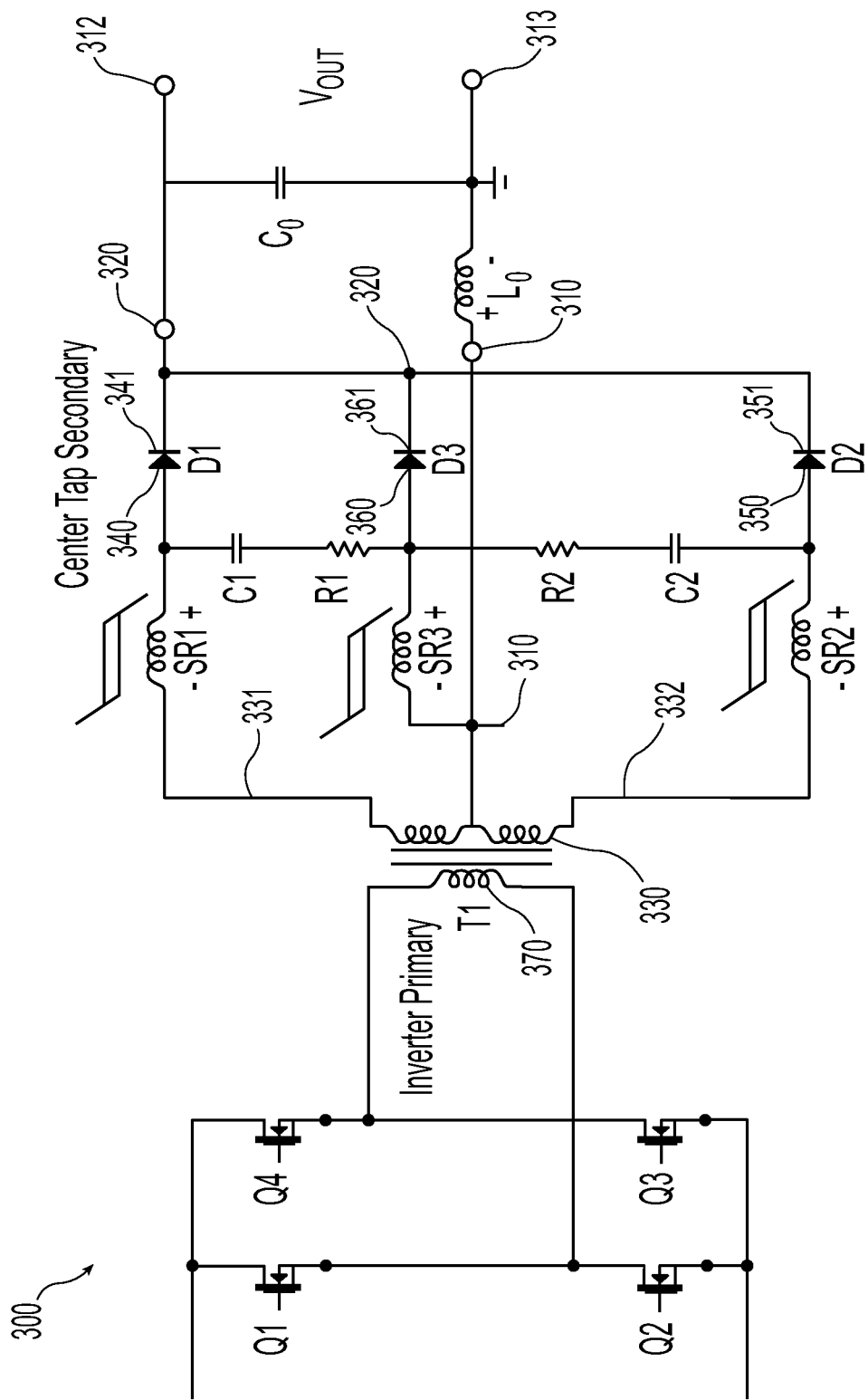
FIG. 3 illustrates an example embodiment of a modified inverter rectifier output circuit of a high speed amplifier inverter that may be used in a welding power supply.

FIG. 3 illustrates an example embodiment of a modified inverter rectifier output circuit 300 of a high speed amplifier inverter that may be used in a welding power supply. Such a modified inverter rectifier output circuit 300 greatly reduces the undesired thermal effects on the saturable reactors during both turn-on portions and turn-off portions of the diode transitions (i.e., during the switching times).

An RC network (R1, C1, R2 C2) is connected between the common node of the saturable reactors SR1 and SR2 and the rectifying diodes D1 and D2 as shown in FIG. 3. The transformer T1 includes a primary winding 370 capable of coupling energy to a secondary winding 330. Furthermore a free-wheeling diode D3 in series with another saturable reactor SR3 is connected between the center tap node 310 of the secondary winding 330 of the transformer T1 and the cathode node 320 of the rectifying diodes D1 and D2.

In the inverter output rectifier circuit 300, the secondary winding 330 of the transformer T1 has a first node 331, a second node 332, and a center tap node 310. The first saturable reactor SR1 is connected to the first node 331 and the first rectifying diode D1 is connected in series with the first saturable reactor SR1 at an anode 340 of the first rectifying diode D1. The second saturable reactor SR2 is connected to the second node 332 and the second rectifying diode D2 is connected in series with the second saturable reactor SR2 at an anode 350 of the second rectifying diode D2.

The third saturable reactor SR3 is connected to the center tap node 310 and the free-wheeling diode D3 is connected in series with the third saturable reactor SR3 at an anode 360 of the free-wheeling diode D3. A first series RC network (R1 and C1) is connected between the anode 340 of the first rectifying diode D1 and the anode 360 of the free-wheeling diode D3. A second series RC network (R2 and C2) is connected between the anode 350 of the second rectifying diode D2 and the anode 360 of the free-wheeling diode D3. A first output node 320 is defined by the connected cathodes 341, 351, and 361 of the first rectifying diode D1, the second rectifying diode D2, and the free-wheeling diode D3. A second output node 310 is defined by the center tap node 310.

During operation, when the inverter voltage at the transformer primary 370 switches polarity, one of the rectifying diodes (e.g., D1) changes from being forward-biased to being reverse biased. The other rectifying diode (e.g., D2) changes from being reverse-biased to forward-biased. The current through the reverse-biased diode (e.g., D1) turns off and all of the current flows through the forward-biased diode (e.g., D2) at the end of the transition. The current change rate through the reverse-biased diode (e.g., D1) is slowed down and the reverse recovery current of the reverse-biased diode (e.g., D1) is reduced by the associated saturable reactor (e.g., SR1).

The RC network is configured to cooperate with the saturable reactors and permits the suppression of peak voltage associated with the saturable reactors and rectifiers. The capacitor C1 of the RC network is discharged during D1 turn-off. The blocking voltage across SR1 is reduced due to the RC network discharge time. This reduces voltage stress on the saturable reactor SR1 and results in lowering the operating temperature of SR1. Similarly, the capacitor C2 of the RC network is discharged during D2 turn-off. The blocking voltage across SR2 is reduced due to the RC network discharge time. This reduces voltage stress on the saturable reactor SR2 and results in lowering the operating temperature of SR2.

In the absence of the free-wheeling diode D3, the secondary current is forced to go through SR2 and D2 (or SR1 and D1) due to the energy stored by the main secondary inductor. The free-wheeling diode D3 conducts current during the inverter primary voltage transition. For example, current can flow from $L_o$ back through SR3 and D3 instead of through D2 during switching in one direction because the inductance of SR3 is about five times less than the inductance of SR2, in accordance with an embodiment of the present invention. Similarly, current can flow from $L_o$ back through SR3 and D3 instead of through D1 during switching in the other direction because the inductance of SR3 is about five times less than the inductance of SR1, in accordance with an embodiment of the present invention.

As a result, the current change rate through SR2 and D2 (or SR1 and D1) is slower than without D3, and the blocking voltage across SR2 (or SR1) is reduced due to the conduction of D3. This action of D3 during switching transitions provides a soft switching mechanism for the saturable reactor in series with the corresponding diode that is turning on. Furthermore, the saturable reactor SR3 further enhances the soft switching mechanism. When the free-wheeling diode D3 experiences a reverse recovery action when it turns off, a large current spike may be created through D3. SR3 functions to reduce or snub the current spike through D3.

Therefore, D3 conducts (is forward biased) during switching transitions and keeps the resulting blocking voltage across SR2 (or SR1) lower, which keeps SR2 (or SR1) cooler. When switching from D1 being forward biased to D2 being forward biased, C1 and R1 act to keep the blocking voltage low across SR1, and D3 and SR3 act to keep the blocking voltage low across SR2. Similarly, when switching from D2 being forward biased to D1 being forward biased, C2 and R2 act to keep the blocking voltage low across SR2, and D3 and SR3 act to keep the blocking voltage low across SR1.

Figure 4:
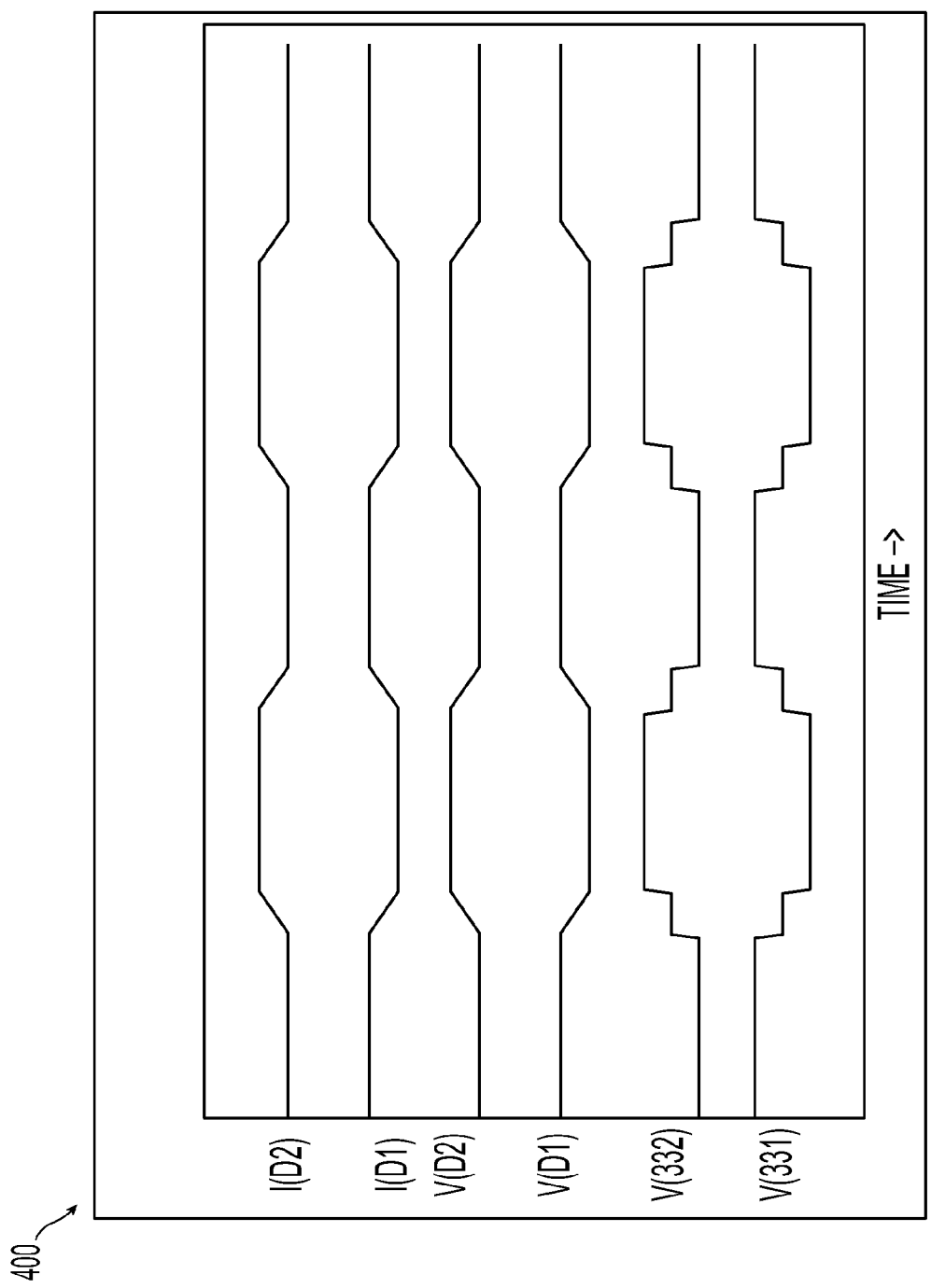
FIG. 4 illustrates an example of a first timing diagram associated with the operation of the modified inverter rectifier output circuit of FIG. 3.

FIG. 4 illustrates an example of a first timing diagram 400 associated with the operation of the modified inverter rectifier output circuit 300 of FIG. 3. The reverse recovery currents I(D1) in diode D1 and I(D2) in diode D2 are almost completely eliminated or snubbed. The voltage ringing that was induced across diodes D1 and D2 (V(D1) and V(D2)) has been smoothed out and eliminated.

Figure 5:
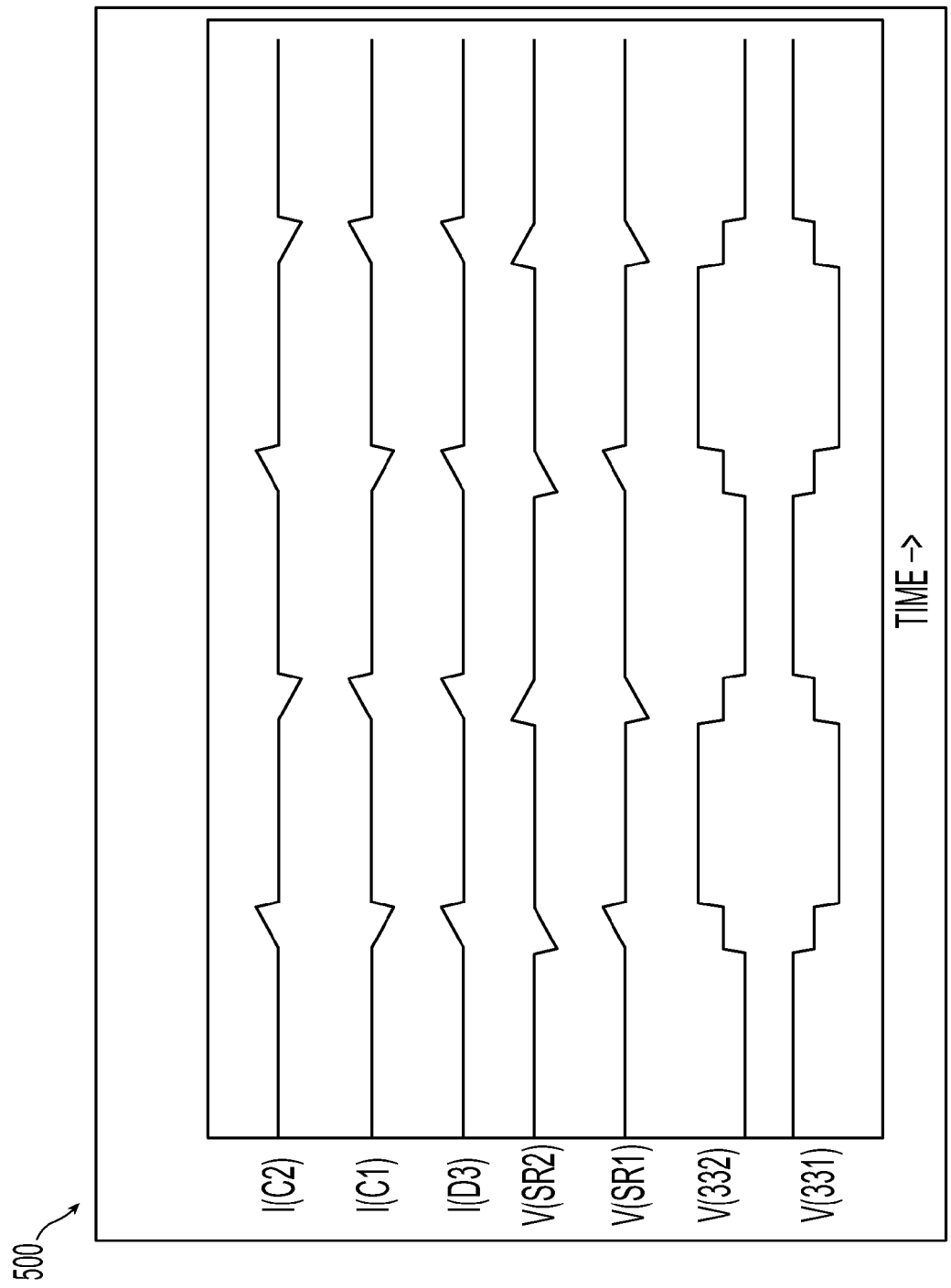
FIG. 5 illustrates an example of a second timing diagram associated with the operation of the modified inverter rectifier output circuit of FIG. 3.

FIG. 5 illustrates an example of a second timing diagram 500 associated with the operation of the modified inverter rectifier output circuit 300 of FIG. 3. The blocking voltages associated with SR1 and SR2 (V(SR1) and V(SR2)) are shown during the transition phase of the inverter switching. The blocking voltages across each device may be both positive and negative, providing a reset for the core material of the saturable reactor device. The current through each capacitor I(C1) and I(C2) is shown. The RC components serve to provide the clamping action for the voltage across each diode. The current through diode D3, I(D3), is shown and provides a path for inductor $L_o$ to continue to conduct current during the transition phase of the inverter switching. The reverse recovery current of I(D3) is mitigated by SR3, providing a further soft switching mechanism for the center tap rectifier 300.

As a result, the RC network (R1, C1, R2, C2) of FIG. 3 functions to reduce the blocking voltage during rectifying diode turn-off portions of transition, and the free-wheeling diode D3 and associated saturable reactor SR3 function to reduce the blocking voltage during diode turn-on portions of transition. The energy dissipated by the saturable reactors is proportional to the blocking voltage integrated over time. Therefore, the temperature rise of the saturable reactors is reduced with less blocking voltage.

The modified inverter rectifier output circuit 300 may also include an output filter circuit. The output filter circuit may include an inductor Lo connected in series with a capacitor Co connected across the output nodes 310 and 320. The capacitor Co is capable of having a load device (e.g., a welding torch and workpiece) connected in parallel therewith at the output nodes 312 and 313 such that the capacitor provides energy storage and ripple reduction of an output voltage Vout.

In summary, disclosed is a modified inverter rectifier output circuit and method for reducing the blocking voltages across saturable reactors associated with a rectifier coupled to a transformer winding in the inverter rectifier output circuit during both turn-on and turn-off transitions of the rectifier. At least a portion of a reverse recovery current associated with the rectifier is blocked by allowing blocking voltages to build across associated saturable reactors during a transition phase of the rectifier. During a turn-off portion of the transition phase, the blocking voltages are reduced using a RC circuit, thereby suppressing a peak voltage associated with the rectifier. During a turn-on portion of the transition phase, the blocking voltages are reduced using another saturable reactor in series with a free-wheeling diode.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An inverter rectifier output circuit, said circuit comprising:
    a secondary winding of a transformer, said secondary winding having a first node, a second node, and a center tap node;
    a first saturable reactor connected to said first node;
    a first rectifying diode connected in series with said first saturable reactor at an anode of said first rectifying diode;
    a second saturable reactor connected to said second node;
    a second rectifying diode connected in series with said second saturable reactor at an anode of said second rectifying diode;
    a third saturable reactor connected to said center tap node;
    a free-wheeling diode connected in series with said third saturable reactor at an anode of said free-wheeling diode;
    a first series RC network connected between said anode of said first rectifying diode and said anode of said free-wheeling diode;
    a second series RC network connected between said anode of said second rectifying diode and said anode of said free-wheeling diode;
    a first output node defined by connected cathodes of said first rectifying diode, said second rectifying diode, and said free-wheeling diode;
    a second output node defined by said center tap node;
    wherein the third saturable reactor has an inductance less than the first saturable reactor and the second saturable reactor at least during switching.

2. The circuit of claim 1 further comprising at least one primary winding of said transformer configured to couple energy to said secondary winding.

3. The circuit of claim 1 further comprising an output filter circuit connected between said first output node and said second output node.

4. The circuit of claim 3 wherein said output filter circuit includes an inductor connected in series with a capacitor.

5. The circuit of claim 4 wherein said capacitor is configured to have a load device connected in parallel therewith, said capacitor providing energy storage and ripple reduction of an output voltage.

6. The circuit of claim 1, wherein the third saturable reactor has an inductance approximately one fifth of one or more of the first saturable reactor at least during switching.

* * * * *